United States Patent
Kimura

(10) Patent No.: US 7,111,557 B2
(45) Date of Patent: Sep. 26, 2006

(54) INCREASING EFFICIENCY IN SETTING OF OUTPUT PARAMETERS TO BE PROVIDED TO AN OUTPUT DEVICE IN AN OUTPUT PROCESSING SYSTEM FOR PRINTING

(75) Inventor: Takehiko Kimura, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 560 days.

(21) Appl. No.: 10/649,768

(22) Filed: Aug. 28, 2003

(65) Prior Publication Data

US 2004/0061899 A1    Apr. 1, 2004

(30) Foreign Application Priority Data

Sep. 27, 2002  (JP) ............... P2002-282855

(51) Int. Cl.
  *B41F 1/54* (2006.01)
  *G06K 15/00* (2006.01)
(52) U.S. Cl. ................... 101/484; 358/1.15
(58) Field of Classification Search ........... 101/484; 358/1.16, 1.15, 1.17; 347/188, 214
See application file for complete search history.

(56) References Cited

U.S. PATENT DOCUMENTS

| | | | |
|---|---|---|---|
| 6,462,756 B1 * | 10/2002 | Hansen et al. | 715/764 |
| 6,570,602 B1 * | 5/2003 | Miller | 347/188 |
| 6,577,907 B1 * | 6/2003 | Czyszczewski et al. | 700/17 |
| 6,930,798 B1 * | 8/2005 | Kaneko | 358/1.9 |
| 6,992,786 B1 * | 1/2006 | Breding et al. | 358/1.15 |
| 2005/0237572 A1 * | 10/2005 | Mori et al. | 358/1.17 |

FOREIGN PATENT DOCUMENTS

| | | |
|---|---|---|
| JP | 7-121329 | 5/1995 |
| JP | 2002-183528 A | 6/2002 |

* cited by examiner

*Primary Examiner*—Andrew H. Hirshfeld
*Assistant Examiner*—Wasseem H. Hamdan
(74) *Attorney, Agent, or Firm*—McDermott Will & Emery LLP

(57) ABSTRACT

An output data processing device capable of increasing efficiency in setting of parameters is provided. Output conditions suitable for each medium to be printed are stored beforehand in relation to each medium. Each time an order is received, the details of the order, print data and a medium are stored in relation to each other in a publication management database. By only selecting a record corresponding to the details of the order among the records stored in the publication management database for an output process, the related output conditions and the corresponding print data are transferred to an output device which in turn performs the output process. Thus, the efficiency is increased in a condition setting process entailed in the output process.

11 Claims, 8 Drawing Sheets

F I G. 3

| ORDER ID | ORDER INFORMATION | |  |
|---|---|---|---|
| | TITLE | CLIENT NAME | |
| ⋮ | ⋮ | ⋮ | |
| 5 | EXTRA NUMBER OF △△ | △△ Co. | |
| ⋮ | ⋮ | ⋮ | |
| 9 | ※% TIMETABLE | ※% BOOKSTORE | |
| ⋮ | ⋮ | ⋮ | |
| 15 | SEP. 13 ISSUE OF ○× WEEKLY | ○× PRESS | |
| ⋮ | ⋮ | ⋮ | |

| PRINT DATA ID | ORDER ID | PRINT DATA STORAGE DESTINATION INFORMATION |
|---|---|---|
| ⋮ | ⋮ | ⋮ |
| 4 | 2 | ¥¥△△Co¥extra |
| ⋮ | ⋮ | ⋮ |
| 12 | 9 | ¥¥※%bookstore01 |
| ⋮ | ⋮ | ⋮ |
| 21 | 15 | ¥¥○×press¥0913¥kansai |
| 22 | 15 | ¥¥○×press¥0913¥chugoku |
| 23 | 15 | ¥¥○×press¥0913¥shikoku |
| ⋮ | ⋮ | ⋮ |

FIG. 5

| MEDIUM ID (33a) | OUTPUT PARAMETER ID (33b) | MEDIUM NAME (33c) |
|---|---|---|
| 1 | 1 | EXTRA NUMBER OF △△ |
| 2 | 2 | ※% TIMETABLE A4 |
| 3 | 4 | ※% TIMETABLE A5 |
| ⋮ | ⋮ | ⋮ |
| 8 | 8 | ○× WEEKLY |
| ⋮ | ⋮ | ⋮ |

Table 33

FIG. 6

| OUTPUT PARAMETER ID (34a) | OUTPUT INFORMATION (34b) | | |
|---|---|---|---|
| | FILM INFORMATION | OUTPUT SCREEN RULING | HALFTONE DOT TYPE |
| 1 | CMYK | 175 | ROUND |
| 2 | Bk | 133 | ROUND |
| ⋮ | ⋮ | ⋮ | ⋮ |
| 4 | Bk | 133 | ROUND |
| ⋮ | ⋮ | ⋮ | ⋮ |
| 8 | CMYK | 133 | ROUND |

Table 34

FIG. 7

| PUBLICATION ID | ORDER ID | MEDIUM ID | PRINT DATA ID | PUBLICATION |
|---|---|---|---|---|
| ⋮ | ⋮ | ⋮ | ⋮ | |
| 6 | 2 | 1 | 4 | |
| ⋮ | ⋮ | ⋮ | ⋮ | |
| 15 | 9 | 2 | 12 | |
| 16 | 9 | 3 | 12 | |
| ⋮ | ⋮ | ⋮ | ⋮ | |
| 27 | 15 | 8 | 21 | |
| 28 | 15 | 8 | 22 | |
| 29 | 15 | 8 | 23 | |
| ⋮ | ⋮ | ⋮ | ⋮ | |

INCREASING EFFICIENCY IN SETTING OF OUTPUT PARAMETERS TO BE PROVIDED TO AN OUTPUT DEVICE IN AN OUTPUT PROCESSING SYSTEM FOR PRINTING

BACKGROUND OF THE INVENTION

1. Field of the Invention

The present invention relates to a technique for saving labor and increasing efficiency in setting of output parameters to be provided to an output device for use in printing.

2. Description of the Background Art

In producing paper media such as newspapers and magazines by printing, it is necessary to set output parameters, e.g. screen ruling and halftone dot type, for an output device to be used, depending on the type of printing paper to be printed. A printer who receives orders from a plurality of publishers to print magazines and the like must generally set different output parameters depending on the publishers and also depending on the magazines to carry out printing. Therefore, such a printer uses techniques for increasing the efficiency of parameter setting, as disclosed in Japanese Patent Application Laid-Open No. 7-121329 (1995).

One of the conventional techniques for increasing the efficiency includes performing automatic processing by preparing batch processing programs, e.g. known as "hot folders," in which predetermined output conditions and the like are set beforehand, the number of batch processing programs being equal to the number of magazines and the like to be printed. Output parameters suitable for printing are set in each of the hot folders corresponding to the individual magazines and the like. When an operator selects a corresponding hot folder in response to a received order or an instruction to print, a predetermined output device automatically executes an output process on prepared print data in accordance with output parameters set beforehand in the selected hot folder.

However, the above-mentioned technique using the hot folders involves the needs to prepare the same number of hot folders as the magazines to be printed and to properly select a hot folder responsive to a received order or an instruction to print among the multiplicity of hot folders. Should an improper selection be made, printing will be carried out using unsuitable output parameters or unsuitable printing paper.

SUMMARY OF THE INVENTION

The present invention is intended for a technique for saving labor and increasing efficiency in setting of output parameters to be provided to an output device in an output processing system for printing.

According to the present invention, an output processing system for performing a predetermined output process on print data comprises: a) a data input device for inputting the print data; b) an output device for performing an output process on the print data; c) a data storage device capable of storing the print data therein, the data storage device including c-1) a first database having stored therein information for identifying individual media to be printed, c-2) a second database having stored therein a set of output parameters for each of the media, c-3) a third database having stored therein order information for printing, c-4) a fourth database having stored therein storage destination information about the print data, and c-5) a fifth database having stored therein setting information for setting a predetermined set of output parameters for the output device, based on the contents of the first to fourth databases; and d) an output data processing device for setting the predetermined set of output parameters for the output device based on the details of an order, the output data processing device including d-1) an input processing element for storing data required for establishment of the setting information into the first to fifth databases, d-2) an output processing element for transferring to the output device the predetermined set of output parameters conforming to a predetermined condition among the sets of output parameters stored in the second database, and d-3) a print data processing element for storing the print data in the data storage device and for reading the print data from the data storage device to transfer the print data to the output device, wherein the output device performs the output process on the print data transferred by the print data processing element in accordance with the predetermined set of output parameters transferred by the output processing element.

Thus, the output conditions for the output device are set in accordance with the contents of the databases. Therefore, the output processing system increases the efficiency of setting the output conditions.

Preferably, the first database has stored therein first records including information for identifying individual media to be printed. The second database has stored therein second records including a set of output parameters for each of the media. The third database has stored therein third records including order information for printing. The fourth database has stored therein fourth records including storage destination information about the print data. The fifth database has stored therein firth records including setting information for setting the predetermined set of output parameters for the output device, based on the contents of the first to fourth databases. The first and second records are stored beforehand, and the third, fourth and fifth records are added each time an order is received. The element at the input process is provided with the following: a first relation element for incorporating information about relation between the order information and the media into the setting information to store the information about relation into the fifth database; and a second relation element for storing information about relation between the order information and the storage destination information about the print data into the fourth database.

The set of output parameters suitable for each medium to be printed are set beforehand. Additionally, the setting information about the output parameters is defined as the information about the relation between the plurality of pieces of information stored in the respective databases. This further facilitates the setting of the predetermined set of output parameters based on the details of an order.

It is therefore an object of the present invention to provide an output data processing device capable of increasing efficiency in setting of parameters for an output device, and an output processing system including the output data processing device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows an example of an order management database;

FIG. 4 shows an example of a print data management database;

FIG. 5 shows an example of a medium management database;

FIG. 6 shows an example of an output parameter management database;

FIG. 7 shows an example of a publication management database; and

DESCRIPTION OF THE PREFERRED EMBODIMENTS

<System Construction>

Figure 1:
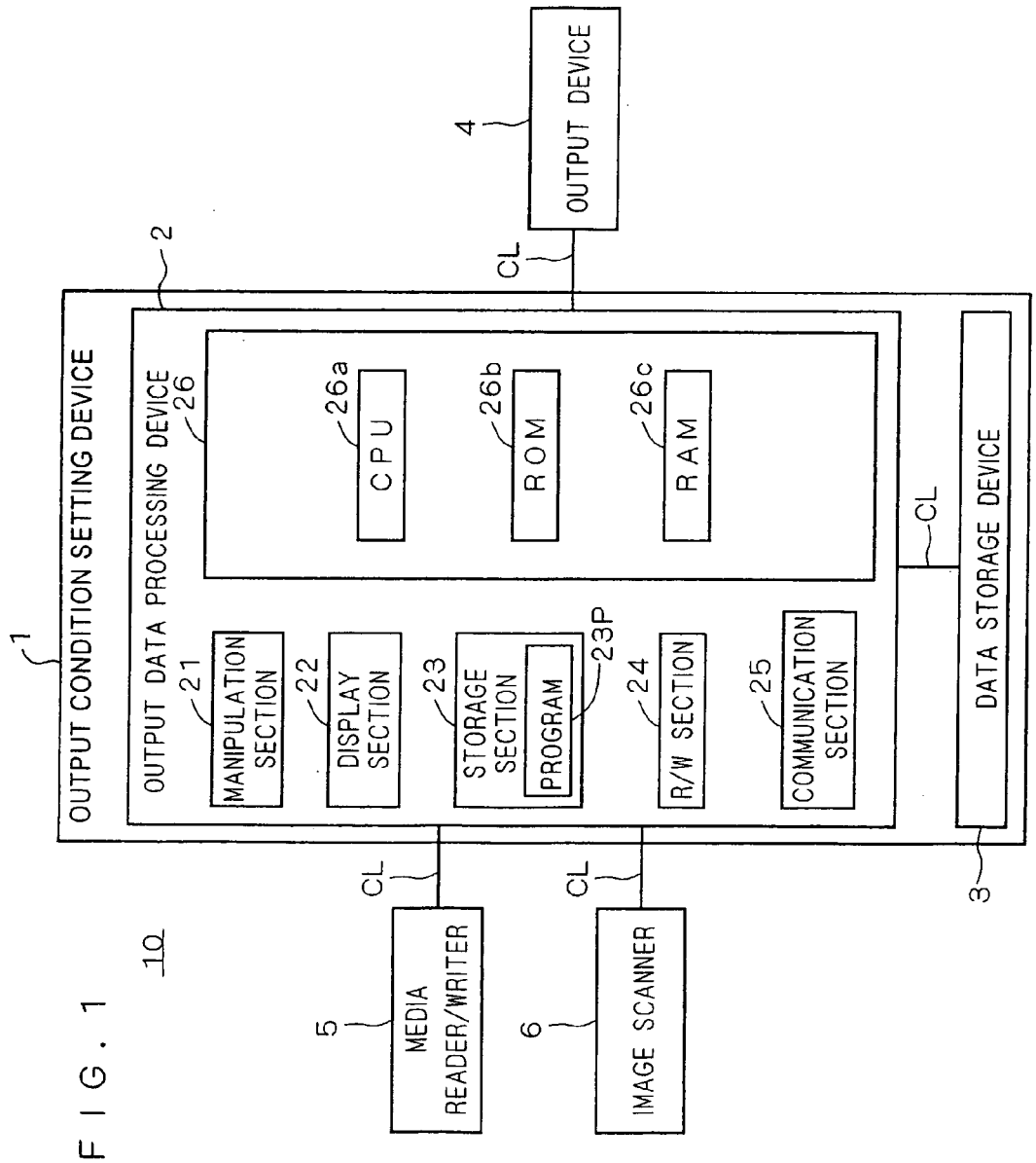
FIG. 1 is a schematic diagram of a printing system according to a preferred embodiment of the present invention.

FIG. 1 is a schematic diagram of a printing system 10 according to a preferred embodiment of the present invention. The printing system 10 principally comprises: an output condition setting device 1 including an output data processing device 2 for setting output parameters of print data to be outputted, in response to the details of an order from a client, and a data storage device 3 for storing the details of the order and the print data inputted to the output data processing device 2 or information including the output parameters set in the output data processing device 2; and an output device 4 receiving the print data (manuscript submission data) to be outputted and the output parameters from the output data processing device 2 to provide a predetermined output based on the received data and parameters.

If a newspaper or magazine publishing company has, for example, an in-house printing division, an instruction to print or the like given from an edit division to the printing division will be regarded as one form of the order in the description.

The output data processing device 2 is connected to a media reader/writer 5 including, for example, an MO drive and a CD-R/RW drive for reading the print data or the like from various portable recording media such as an MO (magneto-optical) disk and a CD-R/RW disk, and to an image scanner 6 for reading information from photographs and paper media. That is, the media reader/writer 5 and the image scanner 6 correspond to data input devices for the output data processing device 2. Additionally, the output data processing device 2 may be capable of receiving the print data or the like directly from other devices through a network (not shown) connected to a communication section 25 to be described later.

The output data processing device 2 is implemented by a computer. Specifically, the output data processing device 2 principally comprises: a manipulation section 21 including a mouse and a keyboard for inputting various commands by an operator; a display section 22 such as a display device; a storage section 23 including a hard disk for storing a program 23p and the like for causing the computer to function as the output data processing device 2; an R/W section 24 for reading and writing data from and to various portable recording media via the media reader/writer 5; the communication section 25 serving as an interface for transferring data to and from other devices connected through signal lines CL and devices on the network not shown; and a control section 26 including a CPU 26a, a ROM 26b and a RAM 26c for implementing functions to be described later.

In the output data processing device 2, a so-called GUI (Graphical User Interface) capable of processing while displaying the details of manipulation through the manipulation section 21 and the current status of various processes on the display section 22 is implemented by the functions of the control section 26, the manipulation section 21 and the display section 22. Processes in respective components to be described later which are implemented in the control section 26 are also carried out using the GUI.

The data storage device 3 is a random-accessible mass storage device functioning as a so-called database server. The data storage device 3 contains a plurality of databases constructed therein which will be described later, and also stores print data PD (FIG. 2) to be outputted from the output device 4.

The output device 4 rasterizes the print data received from the output data processing device 2, in accordance with the output parameters received also from the output data processing device 2, and then provides a predetermined output. Preferred examples of the output device 4 include an image setter for providing a film output for prepress, a CTP (Computer To Plate) device for direct prepress, and a digital printing machine for performing direct printing on printing paper.

Figure 2:
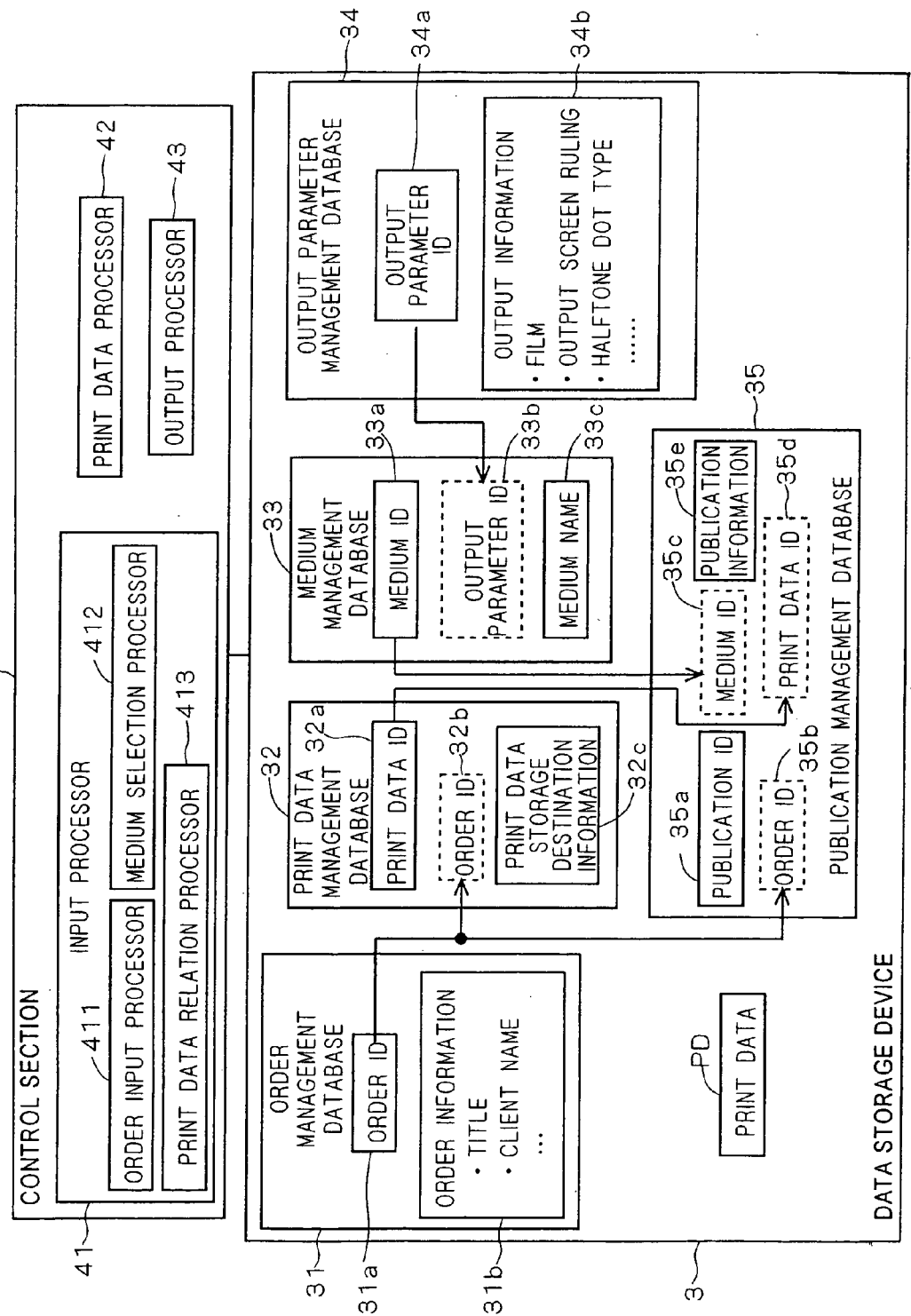
FIG. 2 is a diagram for illustrating functions implemented in a control section of an output data processing device and the details of data stored in a data storage device.

FIG. 2 is a diagram for illustrating the functions implemented in the control section 26 of the output data processing device 2 and the details of data stored in the data storage device 3.

The predetermined program 23p stored in the storage section 23 is executed by the CPU 26a, the ROM 26b and the RAM 26c to cause an input processor 41, a print data processor 42 and an output processor 43 to be implemented in the control section 26.

The input processor 41 is intended to implement functions needed when the operator enters the details of an order and information required for output through the manipulation section 21. The input processor 41 principally includes an order input processor 411, a medium selection processor 412, and a print data relation processor 413.

The order input processor 411 implements a function for allowing the operator to do required inputs in succession by manually operating the manipulation section 21, thereby to store required information in databases to be described later in the data storage device 3. This function is implemented, for example, in such a manner that displaying a predetermined order input processing form (not shown) on the display section 22 enables the operator to enter information in accordance with predetermined input rules.

The medium selection processor 412 implements the function of selecting a medium to be printed, based on the data stored in a medium management database 33 to be described later. This function is implemented, for example, in such a manner that displaying a predetermined medium selection form (not shown) on the display section 22 enables the operator to enter information in accordance with predetermined input rules.

The print data relation processor 413 implements the function of associating order information with the print data PD, based on the data stored in an order management database 31 to be described later. This function is implemented, for example, in such a manner that displaying a predetermined order information selection form (not shown) on the display section 22 enables the operator to enter information in accordance with predetermined input rules.

Functions for storing data in the medium management database 33 and an output parameter management database 34 to be described later are also implemented by the input processor 41.

The print data processor 42 implements functions regarding the process of storing the print data PD in the data storage device 3 and the process of transferring the print data PD to the output device 4 in accordance with the details of the output process stored in a publication management database 35.

The output processor 43 implements the function of reading output parameters properly corresponding to a medium to be printed from the data storage device 3 to transfer the read output parameters to the output device 4 and the function of instructing the print data processor 42 to transfer the print data PD to the output device 4.

The data storage device 3 contains the print data PD stored in a predetermined storage area thereof, and further contains five databases: the order management database 31, a print data management database 32, the medium management database 33, the output parameter management database 34, and the publication management database 35 which are constructed as relational databases related to each other. The process of placing and reading records into and from these databases is also implemented by the program 23p provided in the output data processing device 2.

The order management database 31 is a database for managing information about orders from clients or the like. Each time an order input process is executed, a record is added to the order management database 31 which contains the following principal data items: an order ID 31a serving as a main key; and order information 31b regarding an order title, a client name and the like. The order input processor 411 is responsible for this process. The order ID 31a is an identification number issued in corresponding relation to the individual order information 31b when the individual order information 31b is inputted. FIG. 3 partially shows an example of the order management database 31.

The print data management database 32 is a database for managing the print data to be actually subjected to the output process or to be printed during the output process after the receipt of an order from a client. A record is added to the print data management database 32 which contains the following principal data items: a print data ID 32a serving as a main key; an order ID 32b; and print data storage destination information 32c. The print data storage destination information 32c is information regarding a folder in which the print data is stored or a file name of the print data. The order ID 32b is determined selectively among the order IDs 31a contained in the order management database 31 in accordance with the details of an order so as to properly relate the order information to the corresponding print data. The print data relation processor 413 is responsible for this process. The print data relation processor 413 carries out the relation process in such a manner as to select an order title corresponding to the current print data among a plurality of order titles placed in the order management database 31. FIG. 4 partially shows an example of the print data management database 32.

The medium management database 33 is a database for managing the relation between individual media, i.e. newspapers and magazines, and the output parameters required to print the individual media. A record is added to the medium management database 33 which contains the following principal data items: a medium ID 33a serving as a main key; an output parameter ID 33b; and a medium name 33c. The medium ID 33a is an identification number issued in corresponding relation to the medium name 33c given to each medium. The output parameter ID 33b is determined selectively among output parameter IDs 34a contained in the output parameter management database 34 to be described next so as to properly relate the output parameters to each medium. The medium selection processor 412 is responsible for the process of selecting a medium conforming to the details of the order based on the records placed in the medium management database 33, for example, in such a manner as to select a medium to be printed in response to the order among the plurality of medium names contained in the medium management database 33. FIG. 5 partially shows an example of the medium management database 33.

The output parameter management database 34 is a database regarding the output parameters to be set at the time of the output for each medium. A record is added to the output parameter management database 34 which contains the following principal data items: an output parameter ID 34a serving as a main key; and output information 34b including film information, output screen ruling, halftone dot type, and the like. The output parameter ID 34a is an identification number issued in corresponding relation to the individual output information 34b. The output information 34b in each record of the output parameter management database 34 corresponds to output conditions suitable for the related medium. FIG. 6 partially shows an example of the output parameter management database 34.

The publication management database 35 is constructed based on the records stored in the above-mentioned four databases. A record is added to the publication management database 35 which contains the following principal data items: a publication ID 35a serving as a main key; an order ID 35b; a medium ID 35c; a print data ID 35d; and publication information 35e regarding the publication in the media such as medium name, edition number and the date and time of issue. An individual record stored in the publication management database 35 corresponds to output condition setting information, that is, the details of the output process for one operation to be processed in the output device 4. FIG. 7 partially shows an example of the publication management database 35.

Of the five databases, the order management database 31, the print data management database 32 and the publication management database 35 are those to which a record is added as a result of the entry into the predetermined order input processing form and the like for each order. On the other hand, the medium management database 33 and the output parameter management database 34 generally contain data determined beforehand, and a record is added to the databases 33 and 34 only when performing printing on a new medium.

<Procedure of Processing>

Figure 8:
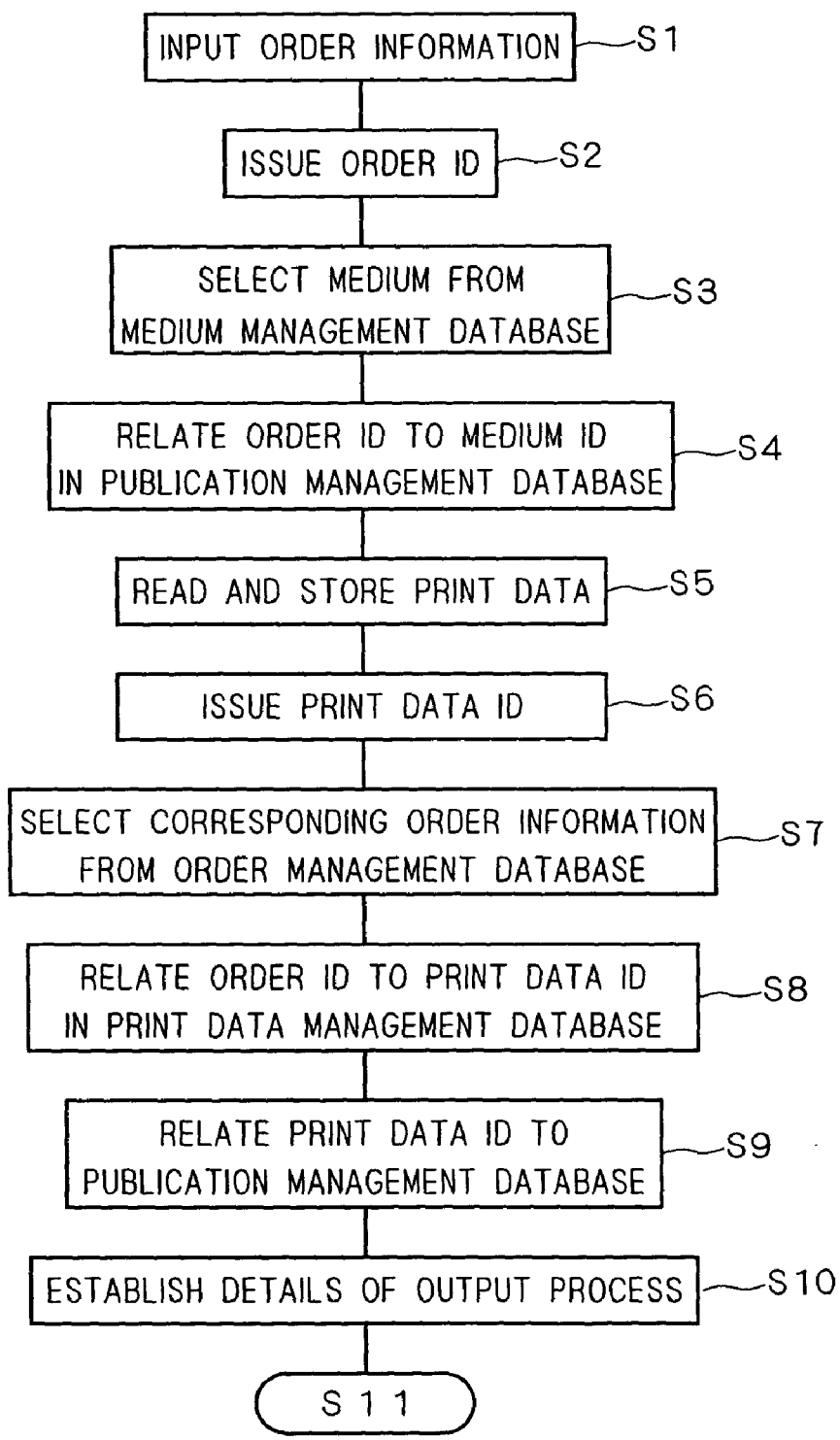
FIGS. 8 and 9 are flowcharts showing a procedure in the printing system.
Figure 9:
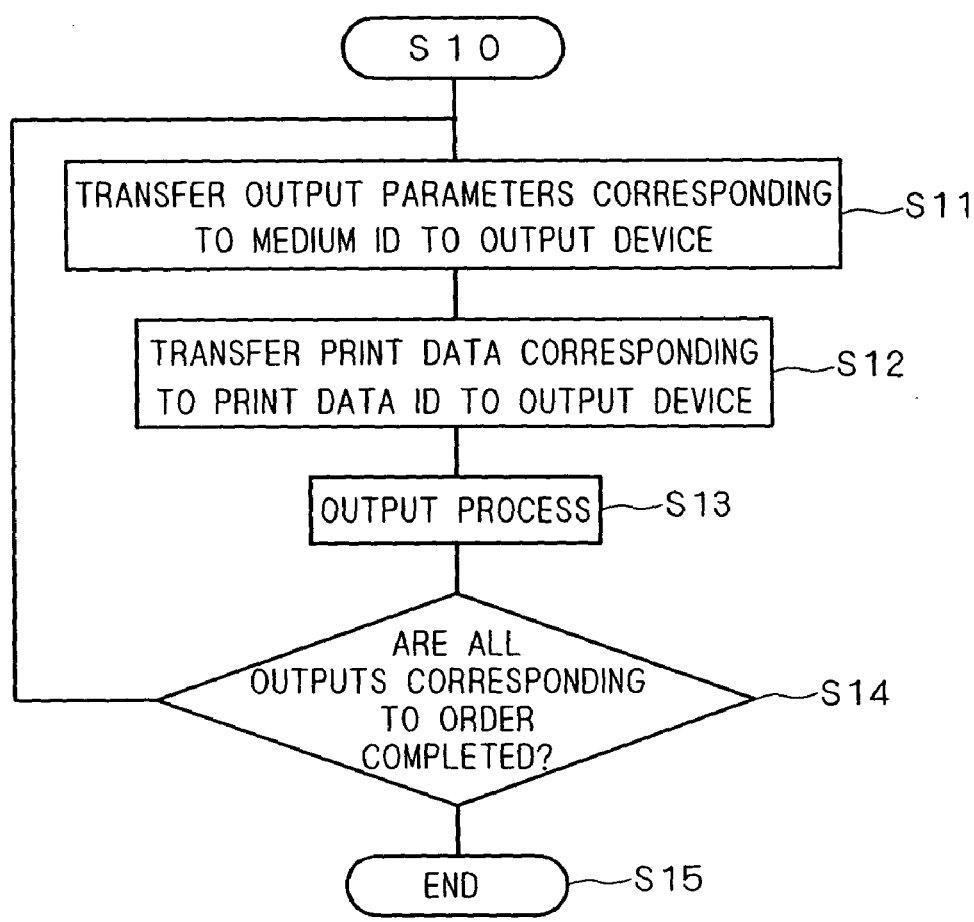

Description will be given on an example of a procedure of processing from the receipt of an order to the execution of the output process in the output device 4 in the printing system 10 according to the preferred embodiment. FIGS. 8 and 9 are flowcharts showing the procedure. It is assumed that the data in the medium management database 33 and the output parameter management database 34 are inputted beforehand.

When receiving a printing order, an operator manually operates the manipulation section 21 to input the order information 31b about the order title and the client name in accordance with the predetermined input rules determined according to the function of the order input processor 411 (in Step S1). The order ID 31a is issued in corresponding relation to the inputted order information 31*b* (in Step S2). This completes the entry of a record corresponding to the order into the order management database 31 (See FIG. 3). When a medium to be printed is selected according to the function of the medium selection processor 412 (in Step S3), the order ID 31*a* entered in the order management database 31 and the medium ID 33*a* corresponding to the selected medium are defined respectively as the order ID 35*b* and the media ID 35*c*, which in turn are related to a record to which the publication ID 35*a* is given, in the publication management database 35 (in Step S4). If a plurality of print data are to be printed on the same medium based on the details of the order, the corresponding publication IDs 35*a* may be issued. Predetermined items including inputted order information and the medium name 33*c* corresponding to the medium ID 35*c* are extracted and recorded as the publication information 35*e* in the record. Since the medium ID 33*a* (35*c*) is related to the output parameter ID 33*b* (34*a*) in the medium management database 33, this step results in the establishment of the relation between one publication ID 35*a* and one piece of output information 34*b*.

Next, the print data processor 42 reads the print data PD corresponding to the order into the output data processing device 2 and stores the print data PD into the data storage device 3 (in Step S5). In this step, the print data ID 32*a* corresponding to the individual print data PD is issued (in Step S6), and the print data storage destination information 32*c* is entered in the print data management database 32. The reading of the print data PD is carried out through the media reader/writer 5 from a portable recording medium or via a network not shown. After the print data PD is read, the process of associating the print data PD and the details of the order is performed. First, based on the function of the print data relation processor 413, the operator performs a predetermined operation through the manipulation section 21 to select an order ID 31*a* corresponding to the read print data PD among the order IDs 31*a* corresponding to the order information in the order management database 31 (in Step S7). The selected order ID 31*a* is defined as the order ID 32*b*, which in turn is related to a record containing the corresponding print data ID 32*a*, in the print data management database 32 (in Step S8). This completes the entry of the record into the print data management database 32. There are cases where one order requires the printing of a plurality of print data on the same medium depending on the details of the order. In such cases, the same order ID is related to a plurality of records corresponding to the respective print data, and the plurality of records are added to the print data management database 32. (See FIG. 4).

The reading of the print data PD need not be carried out simultaneously with the receipt of the order. With the process of receiving the order performed beforehand, the print data PD may be read after the print data PD is completed. When the print data PD stored once is used again, the print data PD need not be read again. In this case, a record is generated by issuing the print data ID 32*a* and storing information about the destination in which the existing print data PD is stored, and immediately thereafter the above-mentioned relation is established.

After the relation between the print data ID 32*a* and the order ID 32*b* is established in the print data management database 32, the print data ID 32*a* is related, as the print data ID 35*d*, to the record containing the corresponding order ID 35*b* also in the publication management database 35 in accordance with the above-mentioned relation (in Step S9). This completes the entry of the record regarding the one publication ID 35*a* in the publication management database 35. This is equivalent to the establishment of the details of the output process corresponding to the details of the order (in Step S10). Each record stored in the publication management database 35 corresponds to the indication of the output process (See FIG. 7).

After the record entry in the publication management database 35 is completed or the details of the output process is established, the operator selects an record to be subjected to the output process among the records stored in the publication management database 35 by a predetermined method, thereby to perform the output process. When the selection is made, the output processor 43 transfers to the output device 4 the output information 34*b* related to the selected record of the publication management database 35 by using the media ID 35*c* (33*a*) and the output parameter ID 33*b* (34*a*) as a key (in Step S11). The output processor 43 instructs the print data processor 42 to read the print data PD corresponding to the selected record in accordance with the print data storage destination information 32*c* stored in the print data management database 32. In response to the instruction, the print data processor 42 reads the corresponding print data PD to transfer the read print data PD to the output device 4 (in Step S12).

Based on the received output information 34*b*, the output device 4 performs a predetermined output process on the print data PD (in Step S13). If there are a plurality of records corresponding to one order in the publication management database 35, the process in Steps S11 to S13 is repeated until all of the records are processed (in Step S14). The completion of the processing of all of the records results in the completion of the output process (in Step S15).

As described hereinabove, the medium to be printed and the output conditions suitable for the medium are stored beforehand in relation to each other, and are also entered in relation to each other into the publication management database 35 in this preferred embodiment. This allows the output process to be performed only by selecting a record corresponding to the details of the order among the records of the publication management database 35. This increases efficiency in the condition setting process entailed by the output process.

<Modifications>

In the output condition setting device 1, the data storage device 3 need not be a single independent device, but may be integral with the output data processing device 2. Alternatively, the storage section 23 of the output data processing device 2 may have the capability of the data storage device 3 in addition to its original capability.

The input processor 41 may have the function of extracting a predetermined item from the data about an order transmitted through a network not shown.

While the invention has been described in detail, the foregoing description is in all aspects illustrative and not restrictive. It is understood that numerous other modifications and variations can be devised without departing from the scope of the invention.

What is claimed is:

1. An output processing system for performing a predetermined output process on print data, comprising:
   a) a data input device for inputting said print data;
   b) an output device for performing an output process on said print data;
   c) a data storage device capable of storing said print data therein, said data storage device including
      c-1) a first database having stored therein information for identifying individual media to be printed, c-2) a second database having stored therein a set of output parameters for each of said media, c-3) a third database having stored therein order information for printing, c-4) a fourth database having stored therein storage destination information about said print data, and c-5) a fifth database having stored therein setting information for setting a predetermined set of output parameters for said output device, based on the contents of said first to fourth databases; and d) an output data processing device for setting said predetermined set of output parameters for said output device based on the details of an order, said output data processing device including d-1) an input processing element for storing data required for establishment of said setting information into said first to fifth databases, d-2) an output processing element for transferring to said output device said predetermined set of output parameters conforming to a predetermined condition among said sets of output parameters stored in said second database, and d-3) a print data processing element for storing said print data in said data storage device and for reading said print data from said data storage device to transfer said print data to said output device, wherein said output device performs said output process on said print data transferred by said print data processing element in accordance with said predetermined set of output parameters transferred by said output processing element.

2. In a printing processing system for performing a predetermined output process on print data, an output parameter setting device for setting a predetermined set of output parameters suitable for a medium to be printed in an output device, said output parameter setting device comprising:

a) a data storage device capable of storing said print data therein, said data storage device including a-1) a first database having stored therein first records including information for identifying individual media to be printed, a-2) a second database having stored therein second records including a set of output parameters for each of said media, a-3) a third database having stored therein third records including order information for printing, a-4) a fourth database having stored therein fourth records including storage destination information about said print data, and a-5) a fifth database having stored therein firth records including setting information for setting said predetermined set of output parameters for said output device, based on the contents of said first to fourth databases; and b) an output data processing device for setting said predetermined set of output parameters for said output device based on the details of an order, said output data processing device including b-1) an input processing element for storing data required for establishment of said setting information into said first to fifth databases, b-2) an output processing element for transferring to said output device said predetermined set of output parameters conforming to a predetermined condition among said sets of output parameters stored in said second database, and b-3) a print data processing element for storing said print data in said data storage device and for reading said print data from said data storage device to transfer said print data to said output device.

3. The output parameter setting device according to claim 2, wherein said first and second records are stored beforehand, and said third, fourth and fifth records are added each time an order is received.

4. The output parameter setting device according to claim 3, wherein said input processing element includes:

b-1-1) a first relation element for incorporating information about relation between said order information and said media into said setting information to store said information about relation into said fifth database; and b-1–2) a second relation element for storing information about relation between said order information and said storage destination information about said print data into said fourth database.

5. The output parameter setting device according to claim 4, wherein a predetermined fifth record is selected among said fifth records stored in said fifth database;

said output processing element transfers to said output device said predetermined set of output parameters corresponding to said setting information described in said selected fifth record; and said print data processing element transfers to said output device said print data corresponding to said setting information described in said selected fifth record.

6. A method of setting a predetermined set of output parameters suitable for a medium to be printed in an output device in an output processing system for performing a predetermined output process on print data, said method comprising the steps of:

(a) storing in first to fifth databases data required for establishment of setting information for setting said predetermined set of output parameters for said output device;

(b) transferring to said output device said predetermined set of output parameters conforming to a predetermined condition among sets of output parameters stored in said second database;

(c) storing said print data in a data storage device; and (d) reading said print data from said data storage device to transfer said print data to said output device, wherein said output processing system includes said data storage device having said first to fifth databases, said first database having stored therein first records including information for identifying individual media to be printed, said second database having stored therein second records including said sets of output parameters respectively for said media, said third database having stored therein third records including order information for printing, said fourth database having stored therein fourth records including storage destination information about said print data, said fifth database having stored therein firth records including setting information for setting said predetermined set of output parameters for said output device, based on the contents of said first to fourth databases, said predetermined set of output parameters being set based on the details of an order.

7. The method according to claim 6, wherein
said first and second records are stored beforehand, and
said third, fourth and fifth records are added each time an order is received.

8. The method according to claim 7, wherein
said step (a) includes the steps of:
- a-1) incorporating information about relation between said order information and said media into said setting information to store said information about relation into said fifth database; and
- a-2) storing information about relation between said order information and said storage destination information about said print data into said fourth database.

9. The method according to claim 8, wherein
in said step (b), a predetermined fifth record is selected among said fifth records stored in said fifth database, and said predetermined set of output parameters corresponding to said setting information described in said selected fifth record are transferred to said output device; and in said step (d), said print data corresponding to said setting information described in said selected fifth record is transferred to said output device.

10. A computer readable medium which stores a program executed by a computer to cause said computer to function as an output data processing device in a printing processing system, said output data processing device setting a predetermined set of output parameters for an output device based on the details of an order, said output data processing device comprising:
- a) an input processing element for storing in first to fifth databases data required for establishment of setting information for setting said predetermined set of output parameters for said output device,
  - said first database having stored therein first records including information for identifying individual media to be printed,
  - said second database having stored therein second records including a set of output parameters for each of said media,
  - said third database having stored therein third records including order information for printing,
  - said fourth database having stored therein fourth records including storage destination information about said print data,
  - said fifth database having stored therein firth records including said setting information, based on the contents of said first to fourth databases;
- b) an output processing element for transferring to said output device said predetermined set of output parameters conforming to a predetermined condition among said sets of output parameters stored in said second database; and
- c) a print data processing element for storing said print data in a predetermined data storage device provided in said printing processing system and for reading said print data from said data storage device to transfer said print data to said output device.

11. The computer readable medium according to claim 10, wherein
said input processing element stores said first to fifth records in said first to fifth databases provided in said data storage device.

\* \* \* \* \*